United States Patent [19]

Eidson

[11] Patent Number: 5,923,557
[45] Date of Patent: Jul. 13, 1999

[54] METHOD AND APPARATUS FOR PROVIDING A STANDARD INTERFACE TO PROCESS CONTROL DEVICES THAT ARE ADAPTED TO DIFFERING FIELD-BUS PROTOCOLS

[75] Inventor: John C. Eidson, Palo Alto, Calif.

[73] Assignee: Hewlett-Packard Company, Palo Alto, Calif.

[21] Appl. No.: 08/904,364

[22] Filed: Aug. 1, 1997

[51] Int. Cl.[6] ..................................... G06F 7/00
[52] U.S. Cl. .................. 364/471.03; 364/133; 364/138; 710/72; 395/200.54; 395/200.8
[58] Field of Search .................... 364/130, 131, 364/132, 133, 134, 138, 188, 189, 471.03; 395/200.6–200.67, 831, 885, 892, 200.54, 200.8; 370/466, 469; 710/72

[56] References Cited

U.S. PATENT DOCUMENTS

| | | | |
|---|---|---|---|
| 4,517,637 | 5/1985 | Cassell | 364/138 |
| 5,166,678 | 11/1992 | Warrior | 340/825.5 X |
| 5,680,552 | 10/1997 | Netravali et al. | 395/200.8 |
| 5,732,213 | 3/1998 | Gessel et al. | 395/200.54 |
| 5,764,891 | 6/1998 | Warrior | 395/200.2 |
| 5,768,119 | 6/1998 | Havekost et al. | 364/133 |
| 5,771,174 | 6/1998 | Spinner et al. | 364/133 X |

*Primary Examiner*—William Grant
*Assistant Examiner*—Chad Rapp

[57] ABSTRACT

A method and apparatus is disclosed that provides a standard interface to process control devices which are adapted to differing field-bus protocols. The techniques disclosed herein enable integration of process control devices adapted to differing field-bus protocols while avoiding the use of protocol gateways which would otherwise greatly complicate the task of developing process control application programs.

13 Claims, 3 Drawing Sheets

METHOD AND APPARATUS FOR PROVIDING A STANDARD INTERFACE TO PROCESS CONTROL DEVICES THAT ARE ADAPTED TO DIFFERING FIELD-BUS PROTOCOLS

BACKGROUND OF THE INVENTION

1. Field of Invention

The present invention pertains to the field of control systems. More particularly, this invention relates to providing a standard interface to process control devices which are adapted to differing field-bus protocols.

2. Art Background

Industrial process control systems typically make use of a variety of devices such as temperature sensors, pressure sensors, and actuators. Such devices are hereinafter referred to as process control devices. In addition, industrial process control systems commonly make use of field-level control buses which are specialized for the process control environment. Such specialized buses include Profi-bus, LonTalk, SDS, and DeviceNet buses to name a few. Communication buses specialized for the processes control environment are hereinafter referred to as field-buses.

Typically, one or more centralized controllers in such an industrial process control system are used to manage the process control devices. Such a centralized controller may be referred to as a programmable logic controller (PLC). A PLC is usually connected to one or more process control devices via one of the differing types of field-buses. A PLC typically includes a processor that executes a set of application code for communicating with and controlling the corresponding process control devices.

Typically, the application code in a PLC and the process control devices managed by the PLC are adapted to the communication protocol of the particular field-bus being employed. For example, a PLC that connects to process control devices via a Profi-bus typically executes application code that is adapted to the Profi-bus communication protocol. In addition, the process control devices connected to the Profi-bus are usually adapted to the communication protocol of the Profi-bus. Similarly, PLCs and process control devices connected together via an SDS bus are typically adapted to the SDS bus protocol.

It is often desirable to integrate differing process control subsystems into a larger system. Such a situation may arise when two process control plants that use differing field-buses are merged. For example, one plant may have an existing Profi-bus based process control system while the other may have an existing SDS based process control system. It is usually desirable to provide a mechanism for communication between the two differing systems rather than perform an expensive retrofit of process control devices.

One prior solution for providing communication between systems having differing protocols can be found in the field of computer networks in which protocol gateways are commonly used to translate between differing network protocols. For example, protocol gateways are commonly used to provide protocol translation between Ethernet networks and token-ring networks. Such protocol gateways are typically well suited for communication between computer networks which merely exchange files and data.

In contrast, a typical application program running on a PLC in a process control system performs real-time sampling and control of sensors and actuators in a precise manner in which many dependancies among the process control devices can exist. The specialized protocols of field-buses have evolved to meet these specialized needs. As a consequence, a protocol gateway between differing field-buses would likely be very complex and probably could not provide complete translation between protocols. Application programs in a system that included such protocol gateways would probably have to handle at least a portion of all of the field-bus protocols in use in the control system regardless of the existence of protocol gateways.

For example, an application program for a system that included a Profi-bus connected to an SDS bus through a protocol gateway would typically have to handle both Profi-bus and SDS protocols to some extent. Moreover, if the system were to include a LonTalk bus with a corresponding protocol gateway then the application program would probably have to handle all three protocols to some extent. The complexities worsen as more and more differing types of field buses are integrated into the system through protocol gateways. Unfortunately, such complexities typically increase the time and cost of developing application programs in the system and increase the difficulty and cost of maintaining the process control system.

In addition, providers of process control devices are confronted with the task of producing devices that are capable of communication over each of the wide variety of field-bus types in use. For example, the manufacturer of a particular temperature sensor designed for the SDS bus would usually develop permutations of the sensor adapted for the Profi-Bus and SDS buses if they wish to sell into industrial environments that use those types field-buses. Unfortunately, such design permutations typically increases manufacturing and development costs and maintenance costs of such process control devices.

SUMMARY OF THE INVENTION

A method and apparatus is disclosed that provides a standard interface to process control devices which are adapted to differing field-bus protocols. The techniques disclosed herein enable integration of process control devices adapted to differing field-bus protocols while avoiding the use of protocol gateways which would otherwise greatly complicate the task of developing process control application programs. In addition, these techniques enable process control system designers to integrate any type of process control device into a system regardless of the type of field-bus for which the process control device is adapted. The techniques disclosed herein also provide manufacturers of process control devices with a larger potential customer base without having to provide permutations of their process control devices adapted to the wide range of field-bus protocols.

A standard interface is provided by a mapper which includes a means for obtaining a set of information pertaining to the process control device wherein the information describes the process control device according to a predetermined device-oriented protocol that corresponds to the standard interface. The mapper further includes a means for enabling a process control application to access the information using the predetermined device-oriented protocol.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
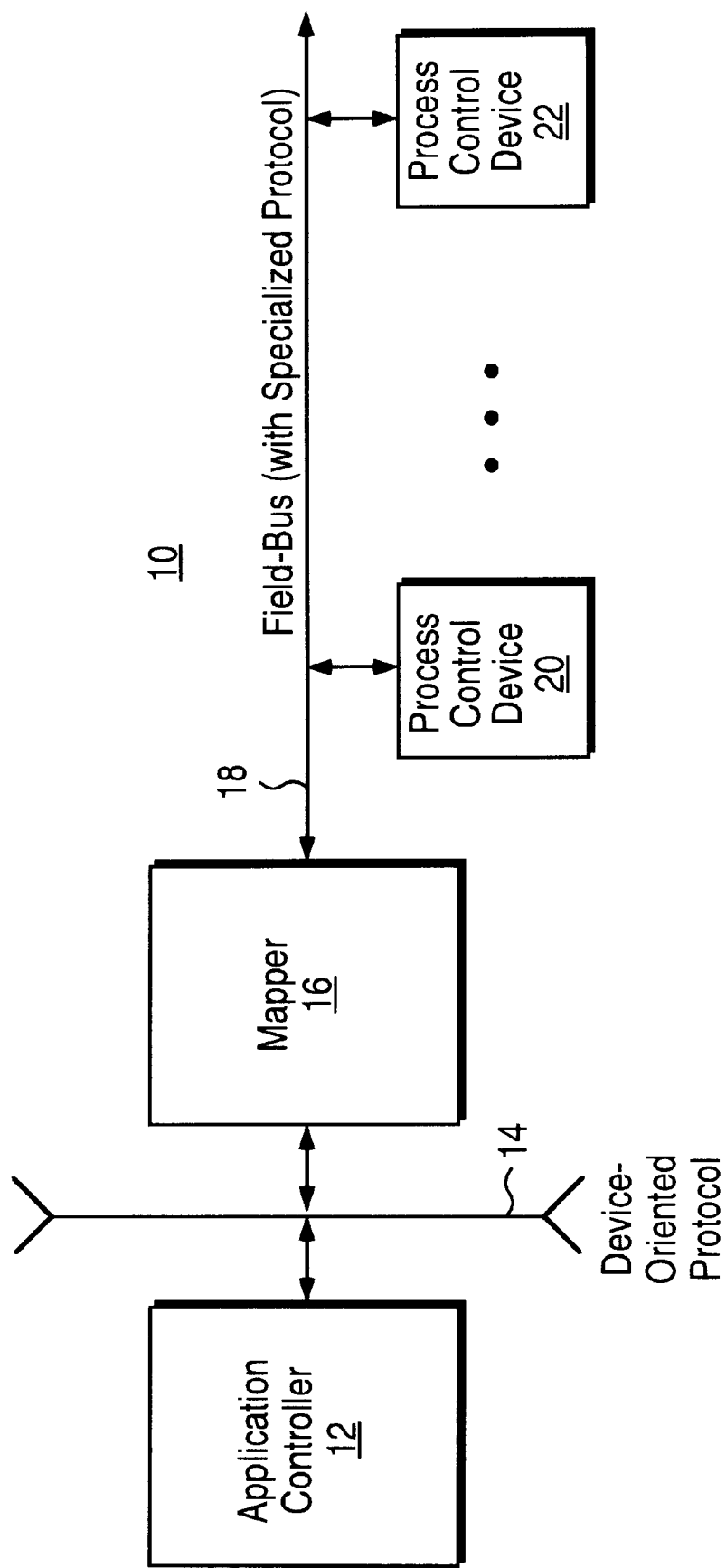
FIG. 1 illustrates a system that provides an application controller with a standard interface to a set of process control devices that are adapted to the specialized protocol of a field-bus.

FIG. 1 illustrates a control system 10 including a mapper 16 and an application controller 12. The mapper 16 provides a standard interface having a device-oriented protocol 14 to a set of process control devices 20–22 that are adapted to a specialized protocol of a field-bus 18.

The process control devices 20–22 each represent a process control device which is designed specifically for communication according to the predetermined protocol of the field-bus 18. For example, any one or more of the process control devices 20–22 may be a temperature sensor, a pressure sensor, or an actuator. In addition, any one or more of the process control devices 20–22 may provide multiple process control functions.

The field-bus 18 represents any one of a number of field buses suitable for communication among process control devices. For example, the field-bus 18 may be embodied as a Profi-bus, a LonTalk, an SDS, a DeviceNet, an SDS bus, or any equivalent bus. If the field-bus 18 is a Profi-bus, for example, then the process control devices 20–22 are each adapted to the Profi-bus communication protocol. Similarly, if the filed-bus 18 is an SDS bus, then the process control devices 20–22 are each adapted to the SDS protocol.

The application controller 12 includes a processor that executes application code for communication with and control of the process control devices 20–22. The application code executed by the application controller 12 is written under the assumption that the process control devices 20–22 conform to the device-oriented protocol 14. As a consequence, the application controller 12 and its application code can be designed and developed without regard to whether the field-bus 18 is a Profi-bus, or an SDS bus, etc.

The device-oriented protocol 14 represents any standard device-oriented protocol that provides for multiple device channels and that defines a protocol that enables the application controller 12 to discover information about attached devices. One standard interface suitable for use as the device-oriented protocol 14 is the proposed IEEE 1451.2 standard. The IEEE 1451.2 proposed standard specifies multiple channels for obtaining device variables and defines a format of information pertaining to each attached device. The information pertaining to a particular attached device describes the type of device, the data rate, units of measure and special triggering requirements, etc.

The mapper 16 communicates with the process control devices 20–22 via the field-bus 18 using the predetermined protocol associated with the field-bus 18. The mapper 16 provides functionality that enables the application controller 12 to communicate with the process control devices 20–22 using the device-oriented protocol 14 such that it appears to the application controller 12 that the process control devices 20–22 are devices that conform to the device-oriented protocol 14. In addition, the mapper 16 builds a set of information pertaining to each of the process control devices 20–22 according to the requirements of the device-oriented protocol 14, which in one embodiment is specified in the IEEE 1451.2 proposed standard.

Figure 2:
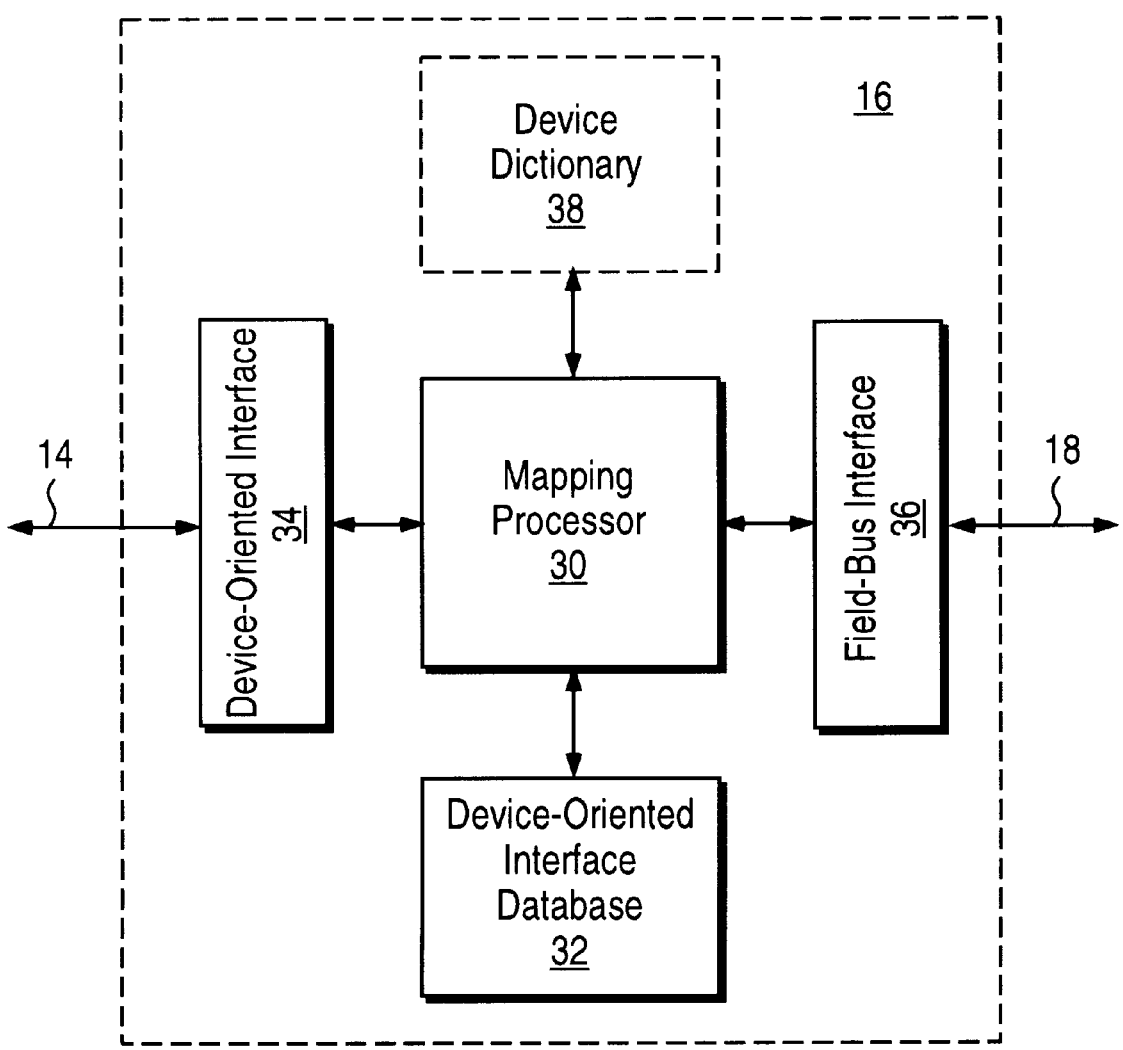
FIG. 2 illustrates a mapper which includes a mapping processor, a device-oriented interface, and a field-bus interface.

FIG. 2 illustrates the mapper 16. The mapper 16 includes a mapping processor 30, a device-oriented interface 34, and a field-bus interface 36. The mapping processor 30 maintains configuration information in a device-oriented interface database 32.

The device-oriented interface 34 enables the mapping processor 30 to communicate with the application controller 12 according to the device-oriented protocol 14. The device-oriented interface 34 includes specialized circuitry and control elements according to the type of device-oriented protocol. In one embodiment, the device-oriented interface includes circuitry and control elements suitable to the IEEE 1451.2 interface standard.

The field-bus interface 36 enables the mapping processor 30 to communicate with the process control devices 20–22 via the field-bus 18 according to the predetermined protocol of the field-bus 18. The field-bus interface 36 includes specialized circuitry and control elements for the field-bus 18. For example, if the field-bus 18 is an SDS bus, then the field-bus interface 36 includes circuitry and control elements for connecting to an SDS bus and for communicating with the devices 20–22 using the SDS protocol.

The mapping processor 30 uses the field-bus interface 36 to detect devices connected to the field-bus 18, i.e. the devices 20–22 and any other devices detectable according to the protocol of the field bus 18. The method used by the mapping processor 30 to detect devices connected to the field-bus 18 depends on the predetermined protocol of the field-bus 18. At the very minimum, each type of field bus protocol provides a method that enables the determination of a device identifier for each connected device. The mapping processor 30 may obtain the device identifiers, for example, by transferring polling or query messages or packets over the field-bus 18 through the field-bus interface 36. The process control devices 20–22 each respond with their respective device identifiers.

The mapping processor 30 builds a set of configuration information into the device-oriented interface database 32. The configuration information which the mapping processor 30 builds into the device-oriented interface database 32 includes information that describes the process control devices 20–22 in terms of the device-oriented protocol 14. As a consequence, the format of the configuration information in the device-oriented interface database 32 depends of the particular device-oriented protocol being used. In the case of the IEEE 1451.2 standard, the configuration information in the device-oriented interface database 32 includes device-specific information and interface-specific information.

The device-specific information in the database 32 includes a set of device-specific information for each of the process control devices 20–22 detected by the mapping processor 30. The device-specific information for a particular process control device includes information such as the number of variables associated with the process control device, the update rate of the process control device, units of measure, triggering requirements, and calibration information. The number of variables associated with a process control device depends upon the particular device. In general, each variable associated with a process control device maps to a channel of the device-oriented protocol 14. For example, a particular process control device may measure both temperature and pressure. In such a case, the process control device would require two channels of the device-oriented protocol 14.

The interface-specific information in the device-oriented interface database 32 is configuration information associated with the device-oriented protocol 14. It includes information such as the number of channels of the device-oriented protocol 14 used up by the devices connected to the field-bus 18, as well as the data rate used for transfers between the application controller 12 and the mapper 16. For example, if the device identifiers returned by the process control devices 20–22 indicate a single variable temperature sensor and a single variable pressure sensor, respectively, then the mapping processor 30 maps these to variables to the first two channels of the device-oriented interface 34. The mapping processor 30 maps the first two channels by writing the interface-specific configuration information in the device-oriented interface database 32 with appropriate values that indicate the first two channels are occupied by device variables.

In one embodiment, the necessary information for building the information into the device-oriented interface database 32 is contained within the process control devices 20–22. The mapping processor 30 obtains the information directly from the process control devices 20–22 via the field-bus 18. For example, the mapping processor 30 may directly query the process control device 20 to obtain information such as device type, units of measure, data rate, triggering requirements, etc.

In the alternative embodiment, the mapping processor 30 obtains the device-specific information for building the database 32 from a device dictionary 38. The device dictionary 38 contains a set of predetermined device-specific information which is tailored in terms of the device-oriented protocol 14 for each particular process control device supported by the mapper 16. The device dictionary 38 may be indexed by the device identifier for a particular process control device. For example, assume the process control device 20 returns a device identifier of "1.7.3.1" in response to a query by the mapping processor 30. The mapping processor 30 converts this device identifier into an index for accessing device-specific information from the device dictionary 38. The mapping processor 30 then reads the device-specific information from the device dictionary 38 and writes it to appropriate entries in the device-oriented interface database 32.

The device dictionary 38 may be embodied in a static or non-volatile memory. However the amount of information that must be stored in the device dictionary 38 can be quite large depending on the number of possible permutations of process control devices supported by the mapper 16 and the amount of information for each device required by the device-oriented protocol 14.

Alternatively, a dictionary of device-specific information is contained on a dictionary server which is external to the mapper 16. For example, the dictionary server may be attached to the field-bus 18. A dictionary server attached to the field-bus 18 is made by the mapper 16 to look to the application controller 12 as another device that conforms to the device-oriented protocol 14. As such, the application controller 12 updates the dictionary server attached to the field-bus 18 as new process control devices become available or are modified in terms of device-specific information.

In another alternative, the dictionary server is coupled to an external network (not shown) which is accessible by the application controller 12. In such a case, the mapping processor 30 passes a dictionary request to the application controller 12 which causes the application controller 12 to retrieve the device-specific information from the external network server that contains the dictionary. The application controller 12 retrieves the information via the external network and passes the information to the mapping processor 30 which writes it into the database 32.

The configuration information contained in the device-oriented interface database 32 is readable by the application controller 12. The mapping processor 30 receives a request for the information from the application controller 12 through the device-oriented interface 34 and in turn reads the device-oriented database 32 and transfers the information to the application controller 12 through the device-oriented interface 34. In this way, the application controller 12 determines or "discovers" what devices are attached, including the process control devices 20–22 and the dictionary server if present.

In the case where the device-oriented protocol 14 is the IEEE 1451.2 standard, the application controller 12 initially transfers a request for the interface-specific information to the mapper 16. In response, the mapping processor 30 reads the interface-specific information from the database 32 and transfers it to the application controller 12 through the device-oriented interface 34. The application controller 12 examines the interface-specific information to determine which channels are being used by the mapper 16. The application controller 12 then issues requests for the device-specific information for each of the individual device channels being used. In response to each request, the mapping processor 30 reads the device-specific information from the database 32 and provides it to the application controller 12 through the device-oriented interface 34.

For example, the device-specific information in the database 32 may inform the application controller 12 that the process control device 20 is a temperature sensor that provides units of Fahrenheit. When the mapping processor 30 obtains a temperature measurement from the process control device 20 via the field-bus 18 it in turn provides the measurement data to the application controller 12 using the particular channel allocated to the process control device 20 on the device-oriented interface 34.

In addition to the channels of the device-oriented interface 34 which are allocated to the process control devices attached to the field-bus 18, the mapping processor 30 allocates two additional channels, referred to as dictionary channels, for obtaining dictionary data from an external server through the application controller 12. A first of the dictionary channels, from the mapping processor 30 to the application controller 12, is used to request dictionary data from the external server. The mapping processor 30 requests the dictionary data for a particular process control device by transferring the device identifier for the particular process control device to the application controller through the first dictionary channel. The application controller 12 interprets the device identifier received through the first dictionary channel as a request for dictionary data from an external server. After retrieving the requested dictionary data, in a manner described below, the application controller 12 transfers it to the mapping processor 30 through the second of the dictionary channels.

The protocol of the particular field-bus 18 may support peer-to-peer communication between the process control devices 20–22. In prior art systems, the peer-to-peer communication was accomplished by attaching a configuration device to the field-bus 18. The configuration device would include an interface for communication via the field-bus 18 and an application program that would setup the peer-to-peer communication by writing configuration information into the process control devices 20–22.

Unfortunately, the protocol for setting up such peer-to-peer communication varies among the types of field-buses 18. For example, with one type of field-bus, the application program on the configuration device writes appropriate information to address tables contained within each of the process control devices 20–22. Such a technique causes the process control device 20 to transfer its measurement data packets over the field-bus 18 with the address of the process control device 22 to accomplish peer-to-peer data transfer between the process control devices 20–22. Other types of field-buses use differing methods for setting up peer-to-peer transfers.

The mapper 16 to provides application controllers with a standardized interface for setting up peer-to-peer communication among the process control devices 20–22. The mapper processor 30 when building the database 32 and allocating channels of the device-oriented interface 34 allocates channels from the application controller 12 to the mapper 16 for use in writing configuration information to the process control devices 20–22 for use peer-to-peer communication. The application controller 12 transfers the configuration data through these channels of the device oriented interface 34 and the mapping processor 30 in turn writes the configuration data to the process control devices 20–22 using the protocol of the field-bus 18.

Table 1 shows the format of the interface-specific configuration information for an embodiment wherein the device-oriented protocol 14 is the proposed IEEE 1451.2 standard. The mapping processor 30 builds the information in the format shown into the device-oriented interface database 32.

TABLE 1

| Field # | Description | # bytes |
|---|---|---|
|  | TEDS version constant related information |  |
| 1 | Meta-TEDS Length | 4 |
| 2 | IEEE P1451 Standards Family Working Group Number | 1 |
| 3 | TEDS Version Number | 1 |
|  | Identification related information |  |
| 4 | Globally Unique Identifier | 10 |
|  | Data structure related information |  |
| 5 | CHANNEL-ZERO Industry Calibration TEDS Extension Key | 1 |
| 6 | CHANNEL-ZERO Industry Non-Volatile Data Fields Extension Key | 1 |
| 7 | CHANNEL-ZERO Industry TEDS Extension Key | 1 |
| 8 | CHANNEL-ZERO End Users' Application Specific TEDS Key | 1 |
| 9 | Number of Implemented Channels | 1 |
| 10 | Worst-Case Channel Data Model Length | 1 |
| 11 | Worst-Case Channel Data Repetitions | 2 |
| 12 | CHANNEL-ZERO writeable TEDS length | 4 |
|  | Timing related information |  |
| 13 | Worst-case channel update time | 4 |
| 14 | Global Write Setup Time | 4 |
| 15 | Global Read Setup Time | 4 |
| 16 | Worst-Case Channel Sampling Period | 4 |
| 17 | Worst-Case Channel Warm Up Time | 4 |
| 18 | Command Response Time | 4 |

TABLE 1-continued

| Field # | Description | # bytes |
|---|---|---|
| 19 | STIM Handshake Timing | 4 |
| 20 | End-Of-Frame Detection Latency | 4 |
| 21 | TEDS Hold-Off Time | 4 |
| 22 | Operational Hold-Off Time | 4 |
| 23 | Maximum Data Rate | 4 |
|  | Channel grouping related information |  |
| 24 | Channel Groupings Data Sub-block Length | 2 |
| 25 | Number of Channel Groupings = G | 1 |
|  | Fields 26–28 repeated G times, once for each group |  |
| 26 | Group Type | 1 |
| 27 | Number of Group Members = N | 1 |
| 28 | Member Channel Numbers List = M(N) | N |
|  | Data Integrity information |  |
| 29 | Checksum for Meta-TEDS | 2 |

Table 2 shows the format of the device-specific configuration information for an embodiment wherein the device-oriented protocol 14 is the proposed IEEE 1451.2 standard. The mapping processor 30 builds the information in the format shown into the device-oriented interface database 32 either directly or by obtaining the information from the device dictionary 38 or a dictionary server.

TABLE 2

| Field # | Description | # bytes |
|---|---|---|
|  | Data structure related information |  |
| 1 | Channel TEDS Length | 4 |
| 2 | Calibration Key | 1 |
| 3 | Channel Industry Calibration TEDS Extension Key | 1 |
| 4 | Channel Industry Non-Volatile Data Fields Extension Key | 1 |
| 5 | Channel Industry TEDS Extension Key | 1 |
| 6 | Channel End Users' Application Specific TEDS Key | 1 |
| 7 | Channel Writeable TEDS Length | 4 |
|  | Transducer related information |  |
| 8 | Channel Type Key | 1 |
| 9 | Physical Units | 10 |
| 10 | Lower Range Limit | 4 |
| 11 | Upper Range Limit | 4 |
| 12 | Worst-Case Uncertainty | 4 |
| 13 | Self Test Key | 1 |
|  | Data converter related information |  |
| 14 | Channel Data Model | 1 |
| 15 | Channel Data Model Length | 1 |
| 16 | Channel Model Significant Bits | 2 |
| 17 | Channel Data Repetitions | 2 |
| 18 | Series Origin | 4 |
| 19 | Series Increment | 4 |
| 20 | Series Units | 10 |
|  | Timing related information |  |
| 21 | Channel Update Time | 4 |
| 22 | Channel Write Setup Time | 4 |
| 23 | Channel Read Setup Time | 4 |
| 24 | Channel Sampling Period | 4 |
| 25 | Channel Warm Up Time | 4 |
| 26 | Channel Aggregated Hold Off Time | 4 |
| 27 | Timing Correction | 4 |
| 28 | Trigger Accuracy | 4 |
|  | Event Sequence Options Field |  |

TABLE 2-continued

| Field # | Description | # bytes |
|---|---|---|
| 29 | Event Sequence Options | 1 |
|  | Data Integrity information |  |
| 30 | Checksum for Channel TEDS | 2 |

Table 3 shows the format of the device-specific configuration information which is related to the calibration characteristics of process control devices for an embodiment wherein the device-oriented protocol 14 is the proposed IEEE 1451.2 standard. The mapping processor 30 builds the information in the format shown into the device-oriented interface database 32 either directly or by obtaining the information from the device dictionary 38 or a dictionary server.

TABLE 3

| Field # | Description | # bytes |
|---|---|---|
|  | Data structure related information |  |
| 1 | Calibration TEDS Length Calibration relating information | 4 |
| 2 | Last Calibration Date-Time | 4 |
| 3 | Calibration Interval | 4 |
| 4 | Number of Correction Input Channels = n | 1 |
| 5 | Correction Input Channel List | n |
| 6 | Correction Input Channel Key List | n |
| 7 | Channel Degree List = D(k) | n |
| 8 | Number of Segments List = $N_k$ | n |
| 9 | Segment Boundary Values Table | $4*(N_1+N_2+ \ldots N_n+n)$ |
| 10 | Segment Offset Values Table | $4*(N_1+N_2+ \ldots N_n)$ |
| 11 | Multinomial coefficient | $4*N_1*N_2* \ldots N_n*$ $[D(1)+1]*[D(2)+1]$ $* \ldots *[D(n)+1]$ |
|  | Data integrity information |  |
| 12 | Checksum for Calibration TEDS | 2 |

Figure 3:
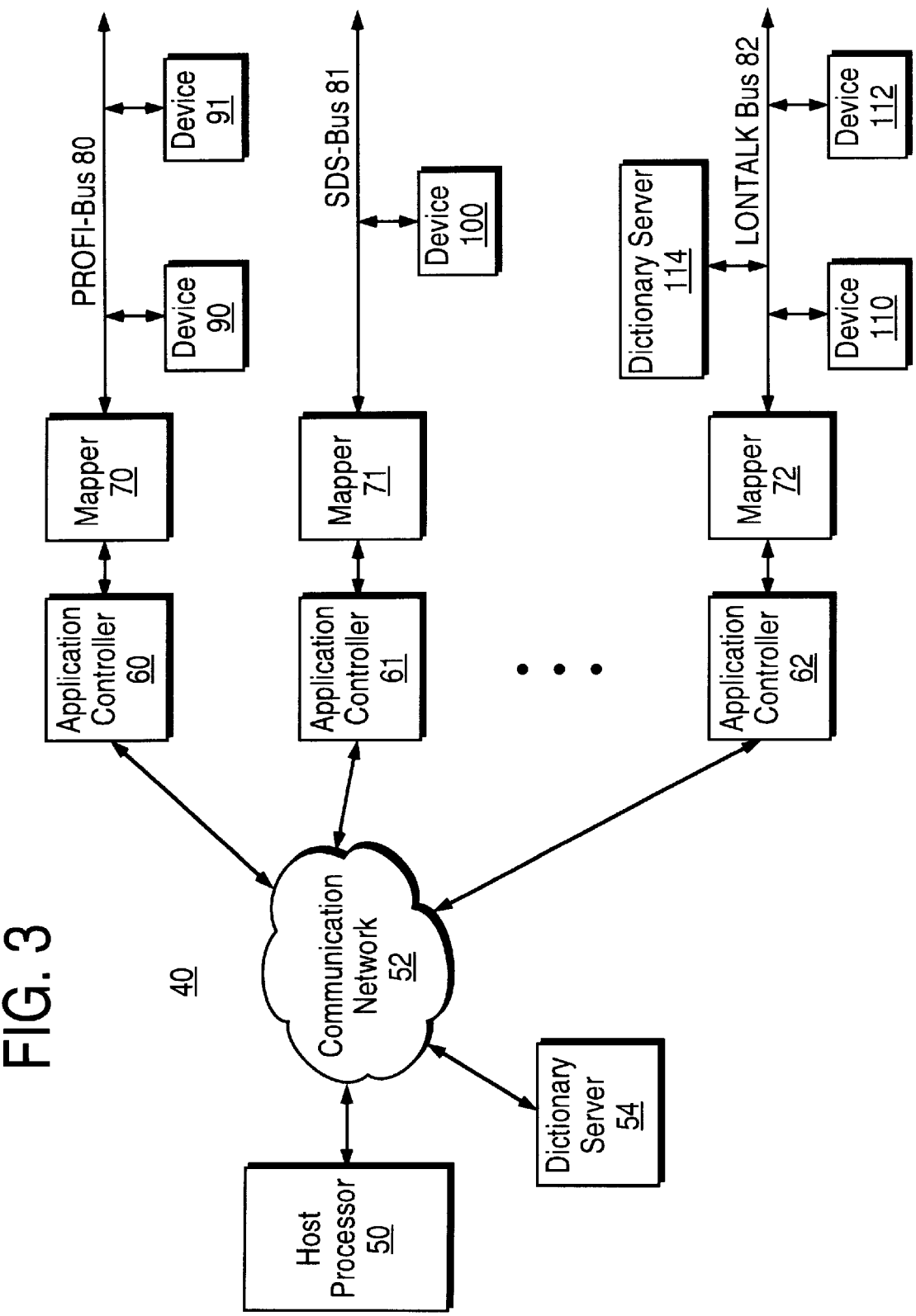
FIG. 3 illustrates an example process control system that enables process control applications executing on a set of application controllers to access process control device adapted to differing field-bus protocols through a standard interface.

FIG. 3 illustrates an example process control system 40 that enables process control applications executing on a set of application controllers 60–62 to access process control device adapted to differing field-bus protocols through a standard interface. The three sets of process control devices 90–91, 100, and 110–112 shown are adapted to a set of differing field-buses 80–82, respectively. The field-buses 80–82 have differing predefined protocols for communication with their respective process control devices. In this example, the protocols of the field-buses 80–82 are the Profi-Bus protocol, the SDS bus protocol, and the LonTalk bus protocol, respectively.

A set of mappers 70–72 enable the application controllers 60–62 to access the process control devices attached to the field-buses 80–82 through a standard device-oriented interface without regard to the protocols of the field-buses 80–82. In this example, the mapper 70 maps between the Profi-Bus protocol of the field-bus 80 and the device-oriented protocol 14 of the application controller 60. Similarly, the mappers 71 and 72 map between the SDS and LonTalk protocols of the field-buses 81 and 82, respectively, and the device-oriented protocol 14 of the application controllers 61 and 62.

The process control system 40 includes a host processor 50 which is in communication with the application controllers 60–62 via a communication network 52. The communication network 52 represents any standard communication network suitable for communication among a variety of types of computers such as an Ethernet network. The host processor 50 uses the communication network 52 to monitor the status of all the devices and applications in the process control system 40.

A dictionary server 114 coupled to the field-bus 82 contains the device-specific information pertaining to the process control devices 110–112 that enables the mapping processor in the mapper 72 to build the device-oriented interface database in the mapper 72. The mapper 72 reads the dictionary server 114 using the LonTalk protocol. In addition, the mapper 72 makes the dictionary server 114 appear to the application controller 62 as a device that conforms to the device-oriented protocol 14. As such, the application controller 62 can write dictionary data to the dictionary server 114 using the device-oriented protocol 14.

A dictionary server 54 coupled to the communication network 54 contains a dictionary of device-specific information that enables the mapping processors in the mappers 70–71 to build device specific information in their respective device-oriented interface databases. The mappers 70–71 obtain the device-specific information for particular process control devices with the aid of the application controllers 60–61.

For example, the mapper 71 and the application controller 61 make use of the two dictionary channels on their device-oriented interface to obtain dictionary data from the dictionary server 54. The application controller 61 includes circuitry and software for communication over the network 52. The application controller 61 in response to a request for dictionary data from the mapper 71 via the first dictionary channel retrieves the requested information from the dictionary server 54 and transfers the information to the mapper 71 through the second dictionary channel.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An apparatus for providing a standard interface to a process control device which is adapted to a predetermined field-bus protocol of a field-bus, comprising:

means for obtaining a set of information pertaining to the process control device wherein the information describes the process control device according to a predetermined device-oriented protocol that corresponds to the standard interface;

means for enabling a process control application to access the information using the predetermined device-oriented protocol;

means for generating a set of interface-related information that specifies at least one channel of the standard interface to be used for communication with the process control device according to a predetermined device-oriented protocol;

means for enabling the process control application to access the interface-related information using the predetermined device-oriented protocol.

2. The apparatus of claim 1, wherein the channel is used by the process control application to read data from the process control device.

3. The apparatus of claim 1, wherein the channel is used by the process control application to write data to the process control device.

4. The apparatus of claim 1, wherein the interface-related information further specifies a set of dictionary channels to be used for obtaining information pertaining to the process control device from an external dictionary server.

5. A process control system, comprising:
- a set of process control devices coupled to a field-bus, wherein each process control device is adapted to a predetermined protocol of the field-bus;
- mapper that enables an application controller to access the process control devices as if the process control devices conformed to a standard interface having a predetermined device-oriented protocol wherein the mapper comprises
- field-bus interface that enables access to the process control devices via the field-bus using the predetermined protocol of the field-bus;
- device-oriented interface that enables communication with the application controller using the predetermined device-oriented protocol;
- database for holding a set of information pertaining to the process control devices which describes the process control devices in terms of the predetermined device-oriented protocol;
- mapping processor that builds the information in the database and that enables access to the information by the application controller via the device-oriented interface.

6. The process control system of claim 5, wherein the mapper further comprises a device dictionary that contains multiples sets of information pertaining to differing types of process control devices from which the mapping processor builds the database.

7. The process control system of claim 5, further comprising a dictionary server coupled to the field-bus wherein the dictionary server contains multiples sets of information pertaining to differing types of process control devices from which the mapping processor builds the database.

8. The process control system of claim 5, further comprising a dictionary server coupled to an external network wherein the dictionary server contains multiples sets of information pertaining to differing types of process control devices from which the mapping processor builds the database.

9. The process control system of claim 5, wherein the mapper further generates a set of interface-related information that specifies at least one channel of the standard interface to be used for communication with each process control device according to a predetermined device-oriented protocol and enables the application controller to access the interface-related information using the predetermined device-oriented protocol.

10. The process control system of claim 9, wherein one of the channels is used by the application controller to read data from the corresponding process control device.

11. The process control system of claim 9, wherein one of the channels is used by the application controller to write data to the corresponding process control device.

12. The process control system of claim 9, wherein one of the channels is used by the application controller to write peer-to-peer configuration data to the corresponding process control device.

13. The process control system of claim 9, wherein the interface-related information further specifies a set of dictionary channels to be used by the application controller and the mapper to communicate information pertaining to the process control device obtain from an external dictionary server.

* * * * *